United States Patent
D'souza et al.

(10) Patent No.: US 11,861,157 B2
(45) Date of Patent: *Jan. 2, 2024

(54) METHODS, SYSTEMS, AND MEDIA FOR PRESENTING OFFSET CONTENT

(71) Applicant: Google LLC, Mountain View, CA (US)

(72) Inventors: Julius D'souza, Palo Alto, CA (US); Chul Jin Ahn, San Jose, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/542,752

(22) Filed: Dec. 6, 2021

(65) Prior Publication Data

US 2022/0091717 A1    Mar. 24, 2022

Related U.S. Application Data (63) Continuation of application No. 15/807,311, filed on Nov. 8, 2017, now Pat. No. 11,194,463.

(51) Int. Cl.
*G06F 3/0488* (2022.01)
*G09G 3/20* (2006.01)
(Continued)

(52) U.S. Cl.
CPC ............ *G06F 3/0488* (2013.01); *G06F 1/163* (2013.01); *G06F 1/1626* (2013.01);
(Continued)

(58) Field of Classification Search
CPC .... G06F 3/0488; G06F 1/1626; G06F 3/0481; G06F 1/163; G09G 3/20; G09G 2340/14;
(Continued)

(56) References Cited

U.S. PATENT DOCUMENTS 6,556,222 B1    4/2003  Narayanaswami
6,668,338 B1   12/2003  Todd et al.
(Continued)

FOREIGN PATENT DOCUMENTS

CN    103376892    10/2013
CN    104866221     4/2015
(Continued)

OTHER PUBLICATIONS

Summons to Attend Oral Proceedings dated Jan. 18, 2022 in EP Patent Application No. 18769540.8.
(Continued)

*Primary Examiner* — Daniel W Parcher
(74) *Attorney, Agent, or Firm* — Shumaker & Sieffert, P.A.

(57) ABSTRACT

Methods, systems, and media for presenting offset content are provided. In some embodiments, the method comprises: causing a first user interface to be presented in a first position on a display of a user device; receiving a user input that indicates that the first user interface is to be shifted; determining an offset for presentation of the first user interface; causing the first user interface to be presented in a second position based on the determined offset such that a portion of the first user interface is no longer visible when the first user interface is presented in the first position and such that a portion of the display is unused when the first user interface is presented in the second position; causing a second user interface that relates to content being presented in the first user interface to be presented within the portion of the display that is unused when the first user interface is presented in the second position; and in response to determining that a predetermined duration of time has elapsed, causing the first user interface to be presented in the first
(Continued)

position and causing the second user interface to be removed.

18 Claims, 6 Drawing Sheets

(51) Int. Cl.
| | |
|---|---|
| *G06F 1/16* | (2006.01) |
| *G06F 3/0481* | (2022.01) |
| *H04N 21/422* | (2011.01) |
| *H04N 21/414* | (2011.01) |
| *H04N 21/41* | (2011.01) |

(52) U.S. Cl.
CPC .............. *G06F 3/0481* (2013.01); *G09G 3/20* (2013.01); *H04N 21/4126* (2013.01); *H04N 21/41407* (2013.01); *H04N 21/42202* (2013.01); *G09G 2320/0693* (2013.01); *G09G 2340/14* (2013.01)

(58) Field of Classification Search
CPC ....... G09G 2320/0693; G09G 2380/02; H04N 21/42202; H04N 21/41407; H04N 21/4126
See application file for complete search history.

(56) References Cited

U.S. PATENT DOCUMENTS

| | | |
|---|---|---|
| 7,847,251 B1 | 12/2010 | Praly |
| 8,760,426 B1 | 6/2014 | Strand et al. |
| 2006/0242121 A1 | 10/2006 | DeVorchik et al. |
| 2007/0203942 A1 | 8/2007 | Hua et al. |
| 2009/0197635 A1 | 8/2009 | Kim et al. |
| 2009/0273565 A1 | 11/2009 | Garside et al. |
| 2009/0325654 A1 | 12/2009 | Shi |
| 2010/0095240 A1 | 4/2010 | Shiplacoff et al. |
| 2010/0243516 A1 | 9/2010 | Martin et al. |
| 2011/0161884 A1 | 6/2011 | Dugan et al. |
| 2012/0032979 A1 | 2/2012 | Blow et al. |
| 2013/0002562 A1 | 1/2013 | Leskela et al. |
| 2013/0283195 A1 | 10/2013 | Bilgen et al. |
| 2014/0267400 A1 | 9/2014 | Mabbutt et al. |
| 2015/0015495 A1 | 1/2015 | Narayanaswami et al. |
| 2015/0206269 A1 | 7/2015 | Qin et al. |
| 2015/0355709 A1 | 12/2015 | Lee et al. |
| 2016/0196054 A1 | 7/2016 | Perez-Feliciano et al. |
| 2016/0240173 A1 | 8/2016 | Bostick et al. |
| 2016/0259548 A1 | 9/2016 | Ma |
| 2016/0266758 A1 | 9/2016 | Li |
| 2017/0010846 A1 | 1/2017 | Bernstein et al. |
| 2018/0101297 A1 | 4/2018 | Yang et al. |

FOREIGN PATENT DOCUMENTS

| | | |
|---|---|---|
| CN | 105209959 | 12/2015 |
| CN | 105814550 | 1/2016 |
| CN | 106648341 | 5/2017 |
| WO | WO 2016204902 | 12/2016 |

OTHER PUBLICATIONS

Examination Report dated Jan. 27, 2021 in IN Patent Application No. 20197047498.
Examination Report dated Dec. 8, 2020 in EP Patent Application No. 18769540.8.
Excelcentral.com, "Excel Tutorial: Hide and Show the Excel Formula Bar and Ribbon," available at https://www.youtube.com/watch?v=HNWGV9C0FHI, Mar. 23, 2015, pp. 1-6.
International Search Report and Written Opinion dated Oct. 11, 2018 in International Patent Application No. PCT/US2018/046892.
Notice of Allowance dated Aug. 5, 2021 in U.S. Appl. No. 15/807,311.
Notice of Allowance dated Oct. 11, 2021 in CN Patent Application No. 201880035799.4.
Office Action dated Mar. 3, 2021 in U.S. Appl. No. 15/807,311.
Office Action dated Mar. 18, 2020 in U.S. Appl. No. 15/807,311.
Office Action dated Mar. 24, 2021 in CN Patent Application No. 20180035799.4.
Office Action dated Apr. 12, 2019 in U.S. Appl. No. 15/807,311.
Office Action dated Jul. 23, 2020 in U.S. Appl. No. 15/807,311.
Office Action dated Jul. 30, 2019 in U.S. Appl. No. 15/807,311.
Intent to Grant from counterpart European Application No. 18769540.8 dated Jul. 27, 2022, 41 pp.
International Preliminary Report on Patentability from International Application No. PCT/US2018/46892 dated May 26, 2020, 7 pp.
Response to Communication pursuant to Article 94(3) EPC dated Dec. 8, 2020 from counterpart European Application No. 18769540.8 filed Apr. 13, 2021, 5 pp.
Response to First Examination Report dated Jan. 27, 2020, from counterpart Indian Application No. 201947047498 filed Jul. 27, 2021, 45 pp.
Response to Rules 161(1) and 162 EPC dated Dec. 17, 2019 from counterpart European Application No. 18769540.8, filed Jun. 29, 2020, 8 pp.
Written Submissions from counterpart European Application No. 18769540.8, filed May 4, 2022, 16 pp.
Additional Written Submissions from counterpart European Application No. 18769540.8, filed Jun. 8, 2022, 28 pp.
Extended Search Report from counterpart European Application No. 22216042.6 dated May 3, 2023, 7 pp.

METHODS, SYSTEMS, AND MEDIA FOR PRESENTING OFFSET CONTENT

CROSS-REFERENCE TO RELATED APPLICATION

This application is a continuation of U.S. patent application Ser. No. 15/807,311, filed Nov. 8, 2017, which is hereby incorporated by reference herein in its entirety.

TECHNICAL FIELD

The disclosed subject matter relates to methods, systems, and media for presenting offset content.

BACKGROUND

People are increasingly using user devices such as smart watches or other wearable computers. These types of user devices often have relatively small display sizes or have curved displays (e.g., a circular display, and/or any other suitable type of curved display). Such a relatively small display size or a curved display can make rendering content on the display difficult. For example, in some situations a small obstruction such as a finger that covers the display or a pair of watch hands of a smart watch can cause some of the content for the presentation on the display to not be visible to the wearer of the device. As another example, it can be difficult to present user interface controls to interact with content that is presented on the display when the display is relatively small in size.

Accordingly, it is desirable to provide methods, systems, and media for presenting offset content.

SUMMARY

Methods, systems, and media for presenting offset content are provided.

In accordance with some implementations of the disclosed subject matter, methods for presenting offset content are provided, the methods comprising: causing a first user interface to be presented in a first position on a display of a user device; receiving a user input that indicates that the first user interface is to be shifted; determining an offset for presentation of the first user interface; causing the first user interface to be presented in a second position based on the determined offset such that a portion of the first user interface is no longer visible when the first user interface is presented in the first position and such that a portion of the display is unused when the first user interface is presented in the second position; causing a second user interface that relates to content being presented in the first user interface to be presented within the portion of the display that is unused when the first user interface is presented in the second position; and in response to determining that a predetermined duration of time has elapsed, causing the first user interface to be presented in the first position and causing the second user interface to be removed.

In accordance with some implementations of the disclosed subject matter, systems for presenting offset content are provided, the systems comprising a memory and a hardware processor that, when executing computer executable instructions stored in the memory, is configured to: cause a first user interface to be presented in a first position on a display of a user device; receive a user input that indicates that the first user interface is to be shifted; determine an offset for presentation of the first user interface; cause the first user interface to be presented in a second position based on the determined offset such that a portion of the first user interface is no longer visible when the first user interface is presented in the first position and such that a portion of the display is unused when the first user interface is presented in the second position; cause a second user interface that relates to content being presented in the first user interface to be presented within the portion of the display that is unused when the first user interface is presented in the second position; and in response to determining that a predetermined duration of time has elapsed, cause the first user interface to be presented in the first position and causing the second user interface to be removed.

In accordance with some implementations of the disclosed subject matter, a nontransitory computer readable medium containing computer executable instructions that, when executed by a processor, cause the processor to perform a method for presenting offset content is provided, the method comprising: causing a first user interface to be presented in a first position on a display of a user device; receiving a user input that indicates that the first user interface is to be shifted; determining an offset for presentation of the first user interface; causing the first user interface to be presented in a second position based on the determined offset such that a portion of the first user interface is no longer visible when the first user interface is presented in the first position and such that a portion of the display is unused when the first user interface is presented in the second position; causing a second user interface that relates to content being presented in the first user interface to be presented within the portion of the display that is unused when the first user interface is presented in the second position; and in response to determining that a predetermined duration of time has elapsed, causing the first user interface to be presented in the first position and causing the second user interface to be removed In accordance with some implementations of the disclosed subject matter, systems for presenting offset content are provided, the systems comprising: means for causing a first user interface to be presented in a first position on a display of a user device; means for receiving a user input that indicates that the first user interface is to be shifted; means for determining an offset for presentation of the first user interface; means for causing the first user interface to be presented in a second position based on the determined offset such that a portion of the first user interface is no longer visible when the first user interface is presented in the first position and such that a portion of the display is unused when the first user interface is presented in the second position; means for causing a second user interface that relates to content being presented in the first user interface to be presented within the portion of the display that is unused when the first user interface is presented in the second position; and means for causing the first user interface to be presented in the first position and causing the second user interface to be removed in response to determining that a predetermined duration of time has elapsed.

In some embodiments, the user input is a press of a button associated with the user device.

In some embodiments, the user input is a tilt of the user device detected by a motion sensor associated with the user device. In some embodiments, the offset is determined based on a magnitude of the tilt.

In some embodiments, the systems further comprise: means for identifying contextual controls associated with the content being presented in the first user interface; and means for causing the contextual controls to be presented in the second user interface within the portion of the display that is unused when the first user interface is presented in the second position.

In some embodiments, the systems further comprise: identifying second contextual controls; and causing the second contextual controls to be presented within the second user interface in the portion of the display that is unused when the first user interface is presented in the second position in response to receiving a user input dismissing the contextual controls from the portion of the display.

In some embodiments, the contextual controls include controls for manipulating playback of media content being presented by the user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various implementations, mechanisms (which can include methods, systems, and media) for presenting offset content are provided.

In some implementations, the mechanisms can cause first content to be presented on a user device, such as a wearable computer (e.g., a smart watch or other wearable computing device), a vehicle computer, a tablet computer, a mobile phone, and/or any other suitable type of computer. In some implementations, the first content can be any suitable type of content, such as a home screen of the user device, a messaging client, map content, content from a fitness tracker, a display associated with a media player, and/or any other suitable type of content. In some implementations, the mechanisms can determine that the first content is to be shifted in a particular direction (e.g., up, down, left, right, and/or in any other suitable direction) and by a particular amount.

In some implementations, the first content can be shifted in a direction that causes a portion of the display to no longer be used to display the first content. For example, in instances where the first content is shifted upward, a bottom portion of the display screen may no longer be used to display the first content. In some such implementations, the mechanisms can cause second content to be presented in the unused portion of the display. For example, in some implementations, the second content can include contextual controls to interact with the first content. As a more particular example, in instances where the first content is a user interface that presents a map, the second content can include user interface controls to zoom in or out on the map, controls to get directions to a particular location, and/or any other suitable controls. As another example, in some implementations, the second content can include contextual controls to interact with an application executing in the background of the user device, such as a media player that is causing audio content to be presented by the user device. As a more particular example, in some implementations, in instances where the contextual controls are controls for interacting with a media player, the contextual controls can include a pause button, a volume adjustment, and/or any other suitable controls.

In some implementations, the mechanisms can determine that the first content is to be shifted based on any suitable information. For example, in some implementations, the mechanisms can determine that the first content is to be shifted based on a determination that a particular button associated with the user device (e.g., a power button, and/or any other suitable button) has been pressed. As another example, in some implementations, the mechanisms can determine that the first content is to be shifted based on a determination that the user device has been rotated or tilted in a particular direction, which can indicate that the first content is to be shifted in a corresponding direction. In yet another example, in some implementations, the mechanisms can determine that the first content is to be offset from its initial center point by a particular distance based on a desired size of the second content including one or more contextual controls.

Figure 1A:
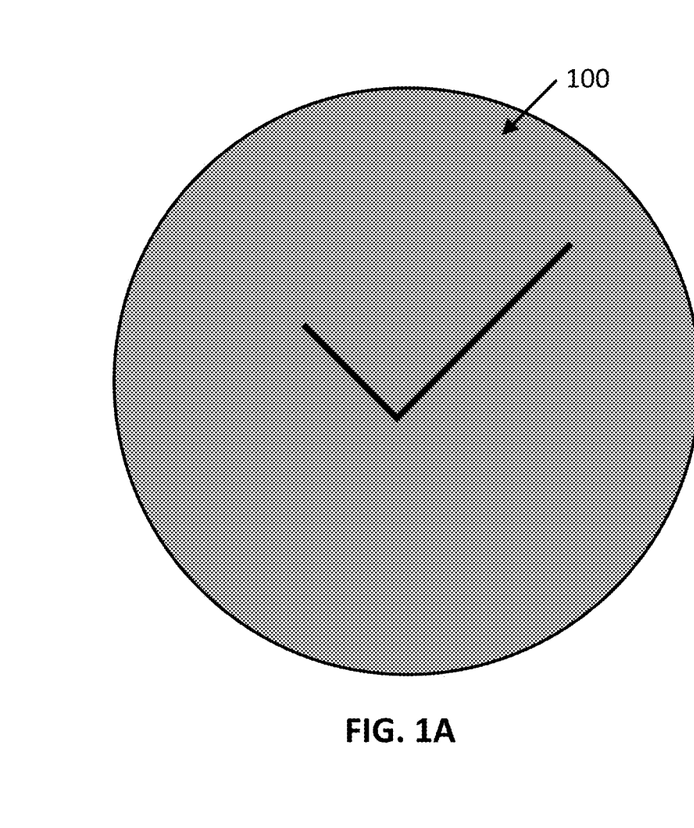
FIGS. 1A and 1B show examples of user interfaces for presenting offset content in accordance with some implementations of the disclosed subject matter.
Figure 1B:
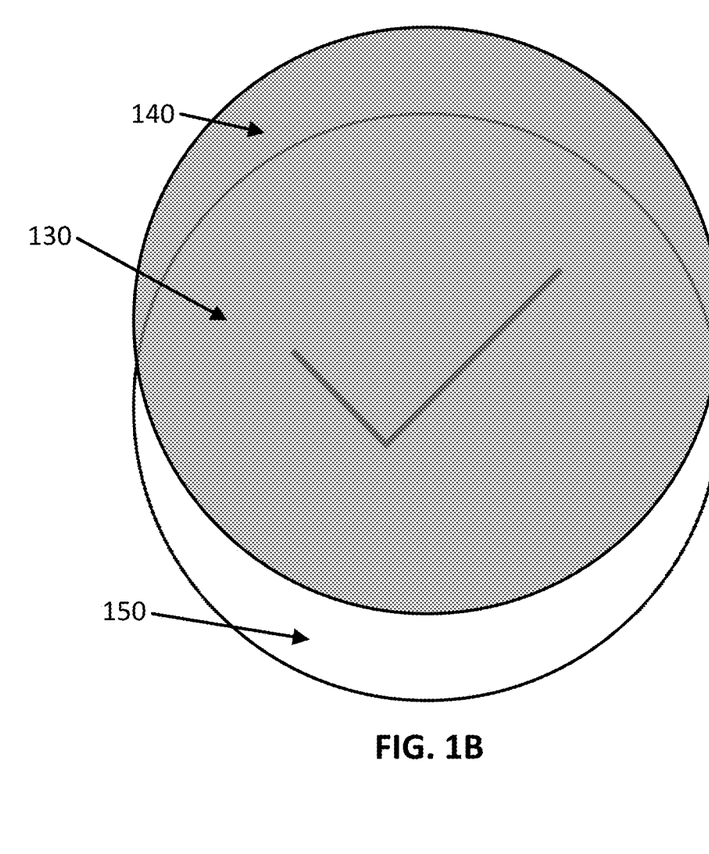

Turning to FIGS. 1A and 1B, illustrative examples of user interfaces for presenting offset content in accordance with some implementations of the disclosed subject matter are shown. In some implementations, the user interfaces can be presented on any suitable type of user device. For example, as shown in FIGS. 1A and 1B, in some implementations, the user interfaces can be presented on a wearable computing device, such as a watch. As another example, in some implementations, the user interfaces can be presented on any other suitable type of user device, such as a mobile phone, a tablet computer, a media player, and/or any other suitable type of user device. Note that, in some implementations, the user device can have a display screen that is of any suitable shape (e.g., a circular shape, an elliptical shape, a square, shape, a rectangular shape, a curved rectangular shape and/or any other suitable shape).

In some implementations, as shown in FIG. 1A, content 100 can be presented on a user device. In some implementations, content 100 can then be shifted (e.g., up, down, left, right, diagonally, and/or in any other suitable direction). For example, as shown in FIG. 1B, content 100 can be shifted upward so that a portion 140 of content 100 is no longer within a display of the user device and a remaining portion 130 of content 100 is displayed on the user device. In some implementations, a portion of a screen that no longer includes content 100, such as portion 150, can be blank, as shown in FIG. 1B. Additionally or alternatively, in some implementations, portion 150 can include any suitable additional content, as shown in and described below in connection with FIGS. 2A-2D. Note that, in some implementations, content 100 can be shifted in response to the user device receiving any suitable type of user input, such as a button press, a detected motion of the user device, and/or any other suitable type of user input, as described below in more detail in connection with block 504 of FIG. 5.

It should be noted that, in some implementations, in response to shifting or offsetting content 100 such that portion 140 of content 100 would no longer be displayed within the display of the user device, content 100 can be modified such that content 100 fits within remaining portion 130. In some implementations, the user device can include a setting for indicating whether to offset content 100 or resize or otherwise redraw content 100 to fit within remaining portion 130. Additionally or alternatively, a content provider associated with content 100 can indicate whether to offset content 100 (or particular types of content) in response to receiving a request to present second content in portion 150. For example, a content provider can associate an indication with the content that inhibits the content from being offset. In another example, a content provider can associate particular controls for presented with a particular type of content (e.g., media playback controls for playing back media content items and navigational controls for interacting with playlists of media content items).

It should also be noted that, in some implementations, the user device can present settings for indicating an offset direction for presenting additional content, such as contextual controls. For example, when the user device is a wearable computing device placed on a left wrist of a user, a setting can be selected to cause content 100 to be offset such that the additional content appears on the right edge of the display. In another example, settings can be presented that cause a first type of content (e.g., contextual controls) to be presented by shifting content 100 in an upward direction, while presenting a second type of content (e.g., indicators of additional content, such as additional information regarding a restaurant corresponding to a location in map content) by shifting content 100 in a diagonal direction and presenting the second type of content in a corner of the display.

It should further be noted that, in some implementations, the user device can determine an offset for content 100 in response to presenting additional content, such as contextual controls for interacting with content 100. For example, the user device can analyze content 100 to determine primary content from secondary content and, based on the determination, can offset content 100 such that the additional content is presented within a region of secondary content while continuing to present at least a portion of the primary content. In a more particular example, content 100 can be analyzed (e.g., either at the user device or transmitted to an external server device for analysis) that includes map content having likely regions of interest and likely regions of non-interest (e.g., blank spaces, regions in which there are no establishments for providing additional content) and, in response to performing the analysis, content 100 can be shifted to present additional content within a region of non-interest while continuing to present likely regions of interest. In another more particular example, content 100 can be analyzed to determine blank portions within content 100 and, based on the determined blank portions, can offset content 100 to present the additional content within a portion of content 100 containing a particular amount of blank portions (e.g., greater than a threshold area).

Figure 2A:
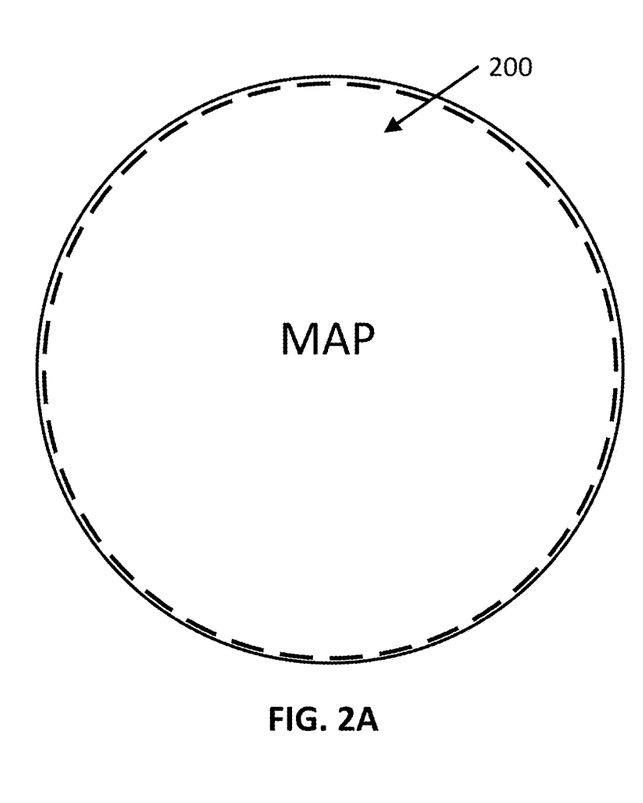
FIGS. 2A-2D show examples of user interfaces for presenting offset content in connection with contextual controls in accordance with some implementations of the disclosed subject matter.
Figure 2B:
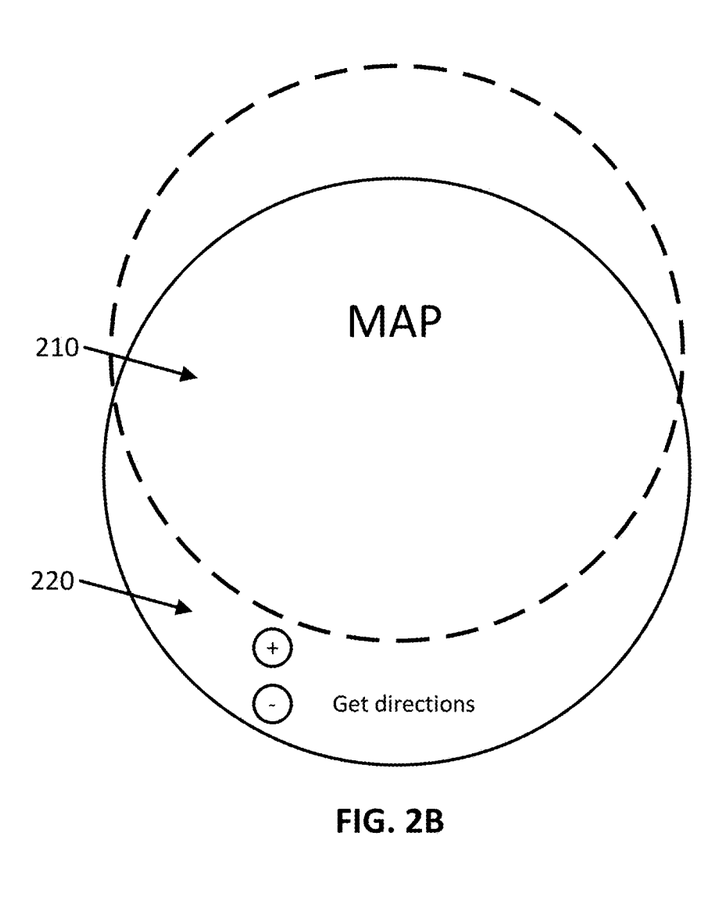

FIGS. 2A and 2B show illustrative examples of user interfaces for presenting map content in accordance with some implementations of the disclosed subject matter. For example, in some implementations, map content 200 can be presented on a user device and can include any suitable images or graphics, such as a map of a particular geographic location. In some implementations, map content 200 can then be shifted (e.g., up, down, left, right, diagonally, and/or in any other suitable direction). For example, as shown in FIG. 2B, map content 200 can be shifted upward so that a portion of map content 200 is no longer visible on the display of the user device and a remaining portion 210 is presented on the user device. Additionally, in some implementations, contextual controls 220 can be presented in a portion of the display that no longer includes map content 200. For example, as shown in FIG. 2B, contextual controls 220 can include controls suitable for interacting with map content 200, such as selectable inputs to zoom in or out of the map content, a selectable input to get directions to a particular location, a selectable input to find a particular type of establishment (e.g., a restaurant, a type of store, etc.) within a geographic location, and/or any other suitable type of controls.

Figure 2C:
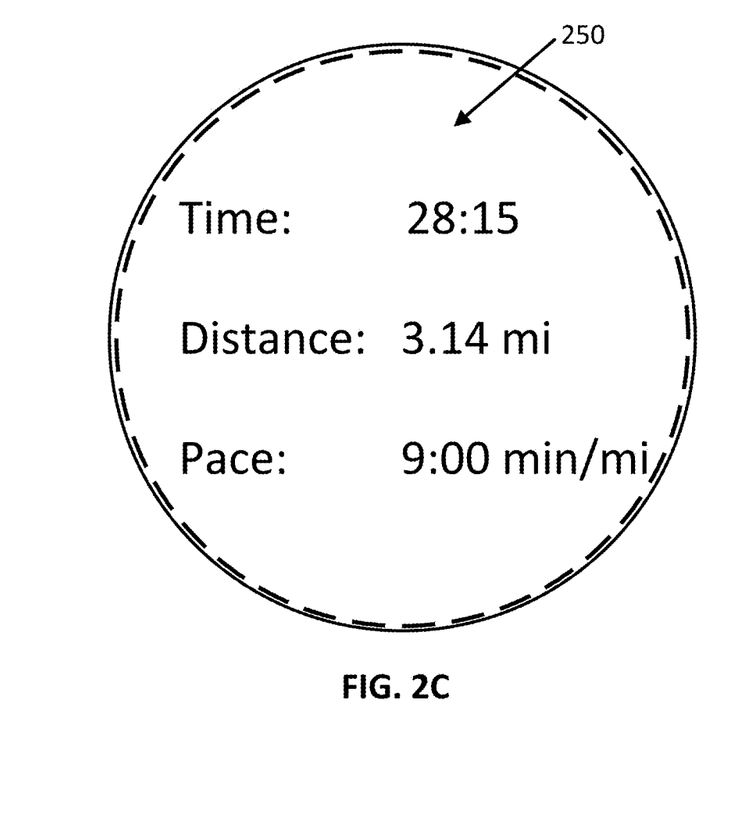
Figure 2D:
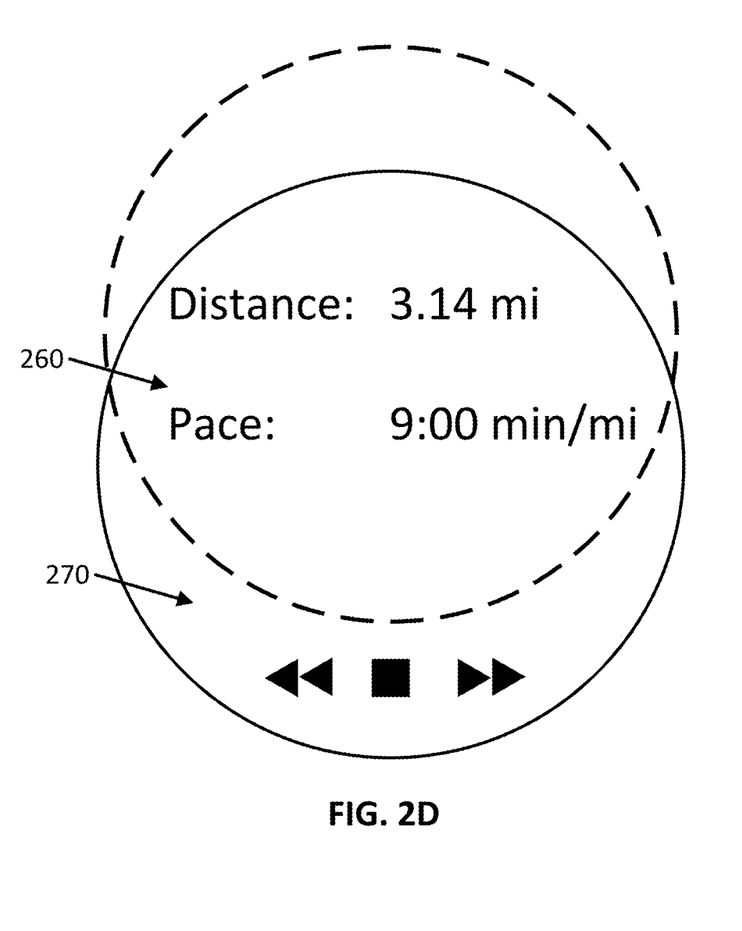

FIGS. 2C and 2D show examples of user interfaces for presenting content associated with a fitness tracker (e.g., a run tracker, a pedometer, and/or any other suitable type of content) in accordance with some implementations of the disclosed subject matter. For example, in some implementations, content 250 can be presented on a user device and can include any suitable text, images, icons, graphics, animations, and/or any other suitable content. As a more particular example, as shown in FIG. 2C, content 250 can include a duration of time elapsed since a timer was started, a distance traveled during the elapsed time, a pace corresponding to the distance traveled, and/or any other suitable information. In some implementations, content 250 can then be shifted (e.g., up, down, left, right, diagonally, and/or in any other suitable direction). For example, as shown in FIG. 2D, content 250 can be shifted in an upward direction so that a portion of content 250 is no longer visible on the display of the user device and a remaining portion 260 is presented on the user device. Additionally, in some implementations, contextual controls 270 can be presented in a portion of the display that no longer includes content 250. For example, in some implementations, contextual controls 270 can include controls suitable for interacting with a fitness tracker (e.g., a selectable input to pause the tracker, a selectable input to detect a current geographic location, and/or any other suitable controls). As another example, in some implementations, contextual controls 270 can include controls that may be useful while using a fitness tracker. As a more particular example, as shown in FIG. 2D, contextual controls 270 can include controls for manipulating playback of audio content a user of the user device may be listening to, such as a stop button, a rewind or fast-forward button, volume adjustment, and/or any other suitable controls.

Note that the examples of map content and fitness tracker content described above in connection with FIGS. 2A-2D are described merely as illustrative examples, and content presented on a user device can be any suitable type of content, such as a home screen of the user device, a messaging screen of the user device, a presentation of a media content item, and/or any other suitable type of content. Additionally, note that, in some implementations, content presented in a portion of a display that no longer includes the shifted content can be manipulated. For example, referring to FIG. 2D, in some implementations, a user of the user device can swipe contextual controls 270 (e.g., right, left, and/or in any other suitable direction), which can cause a different group of contextual controls to be presented.

Figure 3:
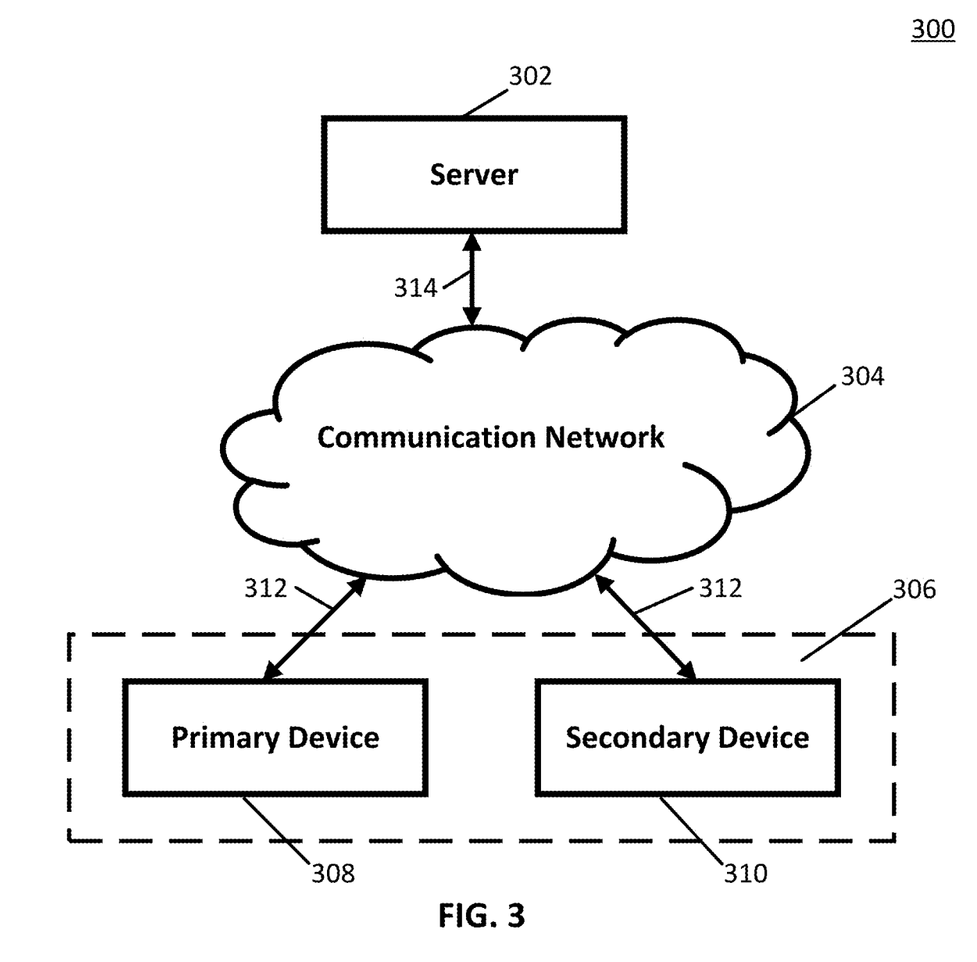
FIG. 3 shows a schematic diagram of an illustrative system suitable for implementation of mechanisms described herein for presenting offset content in accordance with some implementations of the disclosed subject matter.

Turning to FIG. 3, an illustrative example 300 of hardware for presenting offset content that can be used in accordance with some implementations of the disclosed subject matter is shown. As illustrated, hardware 300 can include one or more servers such as a server 302, a communication network 304, and/or one or more user devices 306, such as user devices 308 and 310.

In some implementations, server 302 can be any suitable server for storing content, information, and/or data. For example, in some implementations, server 302 can be a server that stores data related to applications executing on user device 206 and/or that has one or more applications suitable for executing on user device 206 available for download. As another example, in some implementations, server 302 can be a server that streams media content (e.g., music, audiobooks, live-streamed audio content, video content, and/or any other suitable type of media content) to user device 306 via communication network 304. In some implementations, server 302 can be omitted.

Communication network 304 can be any suitable combination of one or more wired and/or wireless networks in some implementations. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links 312 to communication network 304 that can be linked via one or more communications links (e.g., communications link 314) to server 302. Communications links 312 and/or 314 can be any communications links suitable for communicating data among user devices 306 and server 302 such as network links, dial-up links, wireless links, hardwired links, any other suitable communications links, or any suitable combination of such links.

In some implementations, user devices 306 can include one or more computing devices suitable for viewing content, and/or any other suitable functions. For example, in some implementations, user devices 306 can be implemented as a mobile device, such as a wearable computer, a smartphone, a tablet computer, a vehicle (e.g., a car, a boat, an airplane, or any other suitable vehicle) information or entertainment system, a portable media player, and/or any other suitable mobile device. As another example, in some implementations, user devices 306 can be implemented as a non-mobile device such as a desktop computer, a set-top box, a television, a streaming media player, a game console, and/or any other suitable non-mobile device.

Although server 302 is illustrated as a single device, the functions performed by server 302 can be performed using any suitable number of devices in some implementations. For example, in some implementations, multiple devices can be used to implement the functions performed by server 302.

Although two user devices 308 and 310 are shown in FIG. 3, any suitable number of user devices, and/or any suitable types of user devices, can be used in some implementations.

Server 302 and user devices 306 can be implemented using any suitable hardware in some implementations. For example, in some implementations, devices 302 and 306 can be implemented using any suitable general purpose computer or special purpose computer. For example, a server may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Figure 4:
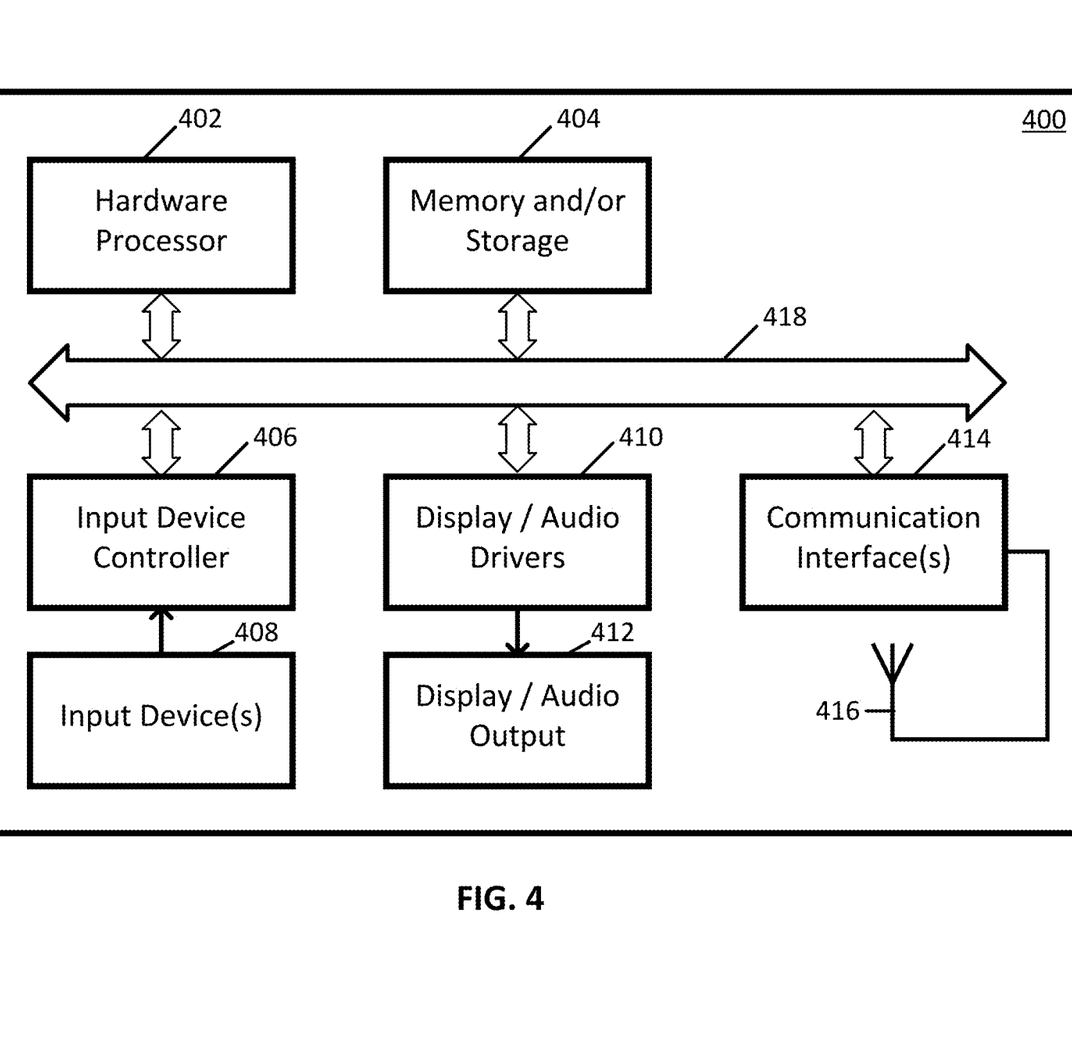
FIG. 4 shows a detailed example of hardware that can be used in a server and/or a user device of FIG. 3 in accordance with some implementations of the disclosed subject matter.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some implementations. In some implementations, hardware processor 402 can be controlled by a server program stored in memory and/or storage 404 of a server (e.g., such as server 302). For example, the server program can cause hardware processor 402 of server 302 to transmit content to a user device and/or receive information from a user device. In some implementations, hardware processor 402 can be controlled by a computer program stored in memory and/or storage 404 of user device 306. For example, the computer program can cause hardware processor 402 of user device 306 to perform any of the functions described in connection with FIG. 5, and/or perform any other suitable functions.

Memory and/or storage 404 can be any suitable memory and/or storage for storing programs, data, media content, advertisements, and/or any other suitable information in some implementations. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some implementations. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a gyroscope, from a temperature sensor, from a near field sensor, and/or any other type of input device.

Display/audio drivers 410 can be any suitable circuitry for controlling and driving output to one or more display/audio output devices 412 in some implementations. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks, such as network 304 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some implementations. In some implementations, antenna 416 can be omitted.

Bus 418 can be any suitable mechanism for communicating between two or more components 402, 404, 406, 410, and 414 in some implementations.

Any other suitable components can be included in hardware 400 in accordance with some implementations.

Figure 5:
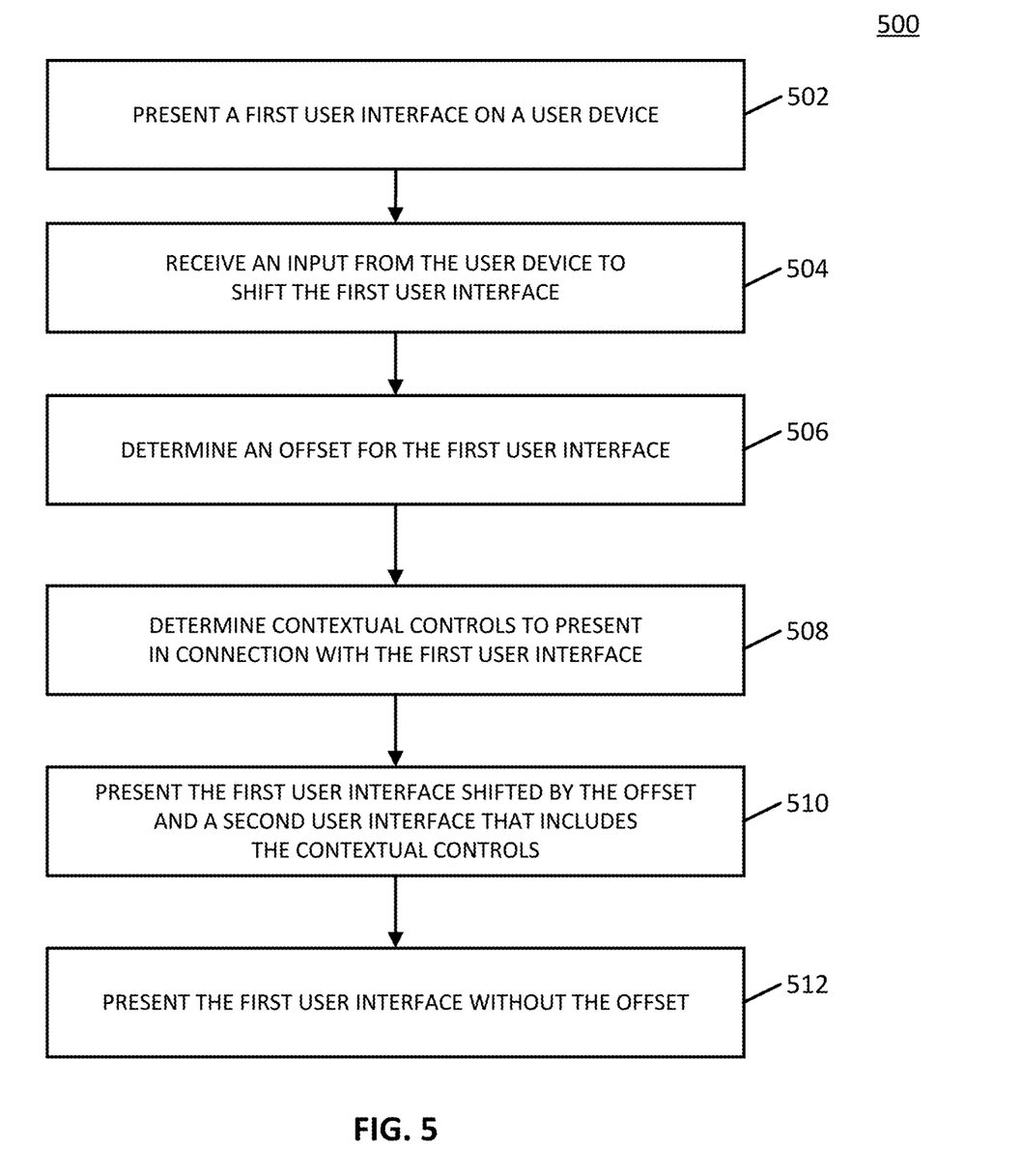
FIG. 5 shows an illustrative example of a process for presenting offset content in accordance with some implementations of the disclosed subject matter.

Turning to FIG. 5, an example 500 of a process for presenting offset content is shown in accordance with some implementations of the disclosed subject matter. In some implementations, blocks of process 500 can be executed on a user device.

In some implementations, process 500 can begin at 502 by causing a first user interface to be presented on a user device. In some implementations, the first user interface can include any suitable content, such as a home screen for the user device, map content, fitness tracker content, a user interface corresponding to a media content player, and/or any other suitable content. In some implementations, process 500 can cause the first user interface to be presented in any suitable manner. For example, as shown in FIGS. 1A, 2A, and 2C, the first user interface can be presented in a manner that occupies an entirety of the display.

At 504, process 500 can receive, from the user device, an input to shift the first user interface. For example, in some implementations, the input can indicate that the first user interface is to be shifted upward (or in any other suitable direction), as shown in FIGS. 1B, 2B, and 2D. In some implementations, the user input can be any suitable input. For example, in some implementations, the user input can be a button press of a button associated with the user device (e.g., a power button, and/or any other suitable button), a swipe or other gesture on a touchscreen of the user device, and/or any other suitable user input. As another example, in some implementations, the user input can be from a directional change or movement of the user device, such as a tilt or rotation of the user device in a particular direction. As a more particular example, in some implementations, the input can be a detection that a user of the user device has tilted the user device upward, which can indicate that the first user interface is to be shifted downward. As another more particular example, in some implementations, the input can be a detection of a finger proximal to the display of the user device, which can indicate a user interest in interacting with content being presented on the first user interface.

In some implementations, process 500 can determine an offset for the first user interface at 506. The offset can indicate any suitable information, such as an amount that the first user interface is to be shifted and/or a direction (e.g., up, down, left, right, diagonally, and/or any other suitable direction) the first user interface is to be shifted. For example, in some implementations, the offset can indicate that the first user interface is to be shifted by a particular fraction or percentage, by a particular number of pixels, by a particular number of millimeters, and/or any other suitable shift. In some implementations, process 500 can determine the offset based on any suitable information. For example, in some implementations, the offset can be a fixed offset of a predetermined size or fraction (e.g., 25%, 30%, 20 pixels, 50 pixels, 10 millimeters, 20 millimeters, and/or any other suitable size) and/or direction that is determined based on any suitable information, such as a size of a user interface that includes contextual controls (e.g., as described above in connection with FIGS. 2A-2D). As a more particular example, a fixed offset can be received from a user of the user device, such as a selected setting indicating a preference to offset the first user interface such that additional content is sized to occupy 40% of the available display of the user device. As another example, in some implementations the offset can be determined based on the user input. As a more particular example, in instances where the user input is a button press, process 500 can determine the offset based on a duration of time the button is pressed. As a specific example, in some implementations, process 500 can begin shifting the first user interface in a particular direction (e.g., up, down, left, right, and/or any other suitable direction) and can continue shifting the first user interface until process 500 determines that the button has been released. As another more particular example, in instances where the user input is based on input from a motion sensor (e.g., a gyroscope, an accelerometer, and/or any other suitable type of motion sensor), process 500 can determine a size and direction of the offset based on the magnitude and direction of motion detected by the motion sensor. As a specific example, in some implementations, process 500 can determine that the offset is to have a direction that corresponds to a direction of rotation or tilt detected by the motion sensor. As another specific example, in some implementations, process 500 can determine that the size of the offset is to be proportional to a degree of rotation detected by the motion sensor. As yet another specific example, process 500 can determine that the first user interface is to begin being shifted in a particular direction in response to determining that the user device is being rotated or tilted, and can continue shifting the first user interface until process 500 determines that the rotation has stopped.

Note that, in some implementations, process 500 can determine that the first user interface is to be shifted to present a portion of the first user interface that is obstructed or not fully visible due to an obstruction (e.g., watch hands and/or a hinge on a watch, a finger covering a display of the user device, and/or any other suitable type of obstruction). In some such implementations, process 500 can determine a size and/or direction of the offset based on the size and placement of the obstruction. For example, in instances where the obstruction is a pair of watch hands or a hinge that the watch hands are connected to, process 500 can determine an amount of the offset based on a size (e.g., length, width, and/or any other suitable size information) of the hands or the hinge, and can determine a direction of the offset based on any suitable information, such as a direction the watch hands are pointing.

Note also that, in some implementations, process 500 can determine that the first user interface is to be shifted in a particular direction based on the content being presented in the first user interface. For example, process 500 can analyze the first user interface and determine which portion of the first user interface can be removed by the offset. In a more particular example, process can analyze the content being presented in the first user interface and determine which portions of the first user interface are likely to contain primary content from which portions of the first user interface are likely to contain secondary content. Based on the determination, process 500 can determine an offset amount such that additional user interface portions or offset content can be presented while the portions that are likely to contain secondary content are removed by the offset amount. For example, in response to determining that the first user interface contains portions having blank content, process 500 can determine an offset amount in which a portion of the first user interface containing blank content is removed from being displayed by the offset amount and the additional user interface portions or offset content are presented in the portion previously containing blank content.

Note also that, in some implementations, process 500 can determine that the first user interface is to be shifted by a particular offset amount based on the additional content to be presented on the user device. For example, process 500 can analyze the additional user interface portions that include contextual controls and can determine the offset amount to apply to the first user interface such that the contextual controls can be displayed at a given size (e.g., based on user preferences). In another example, process 500 can analyze the additional user interface portions that include multiple sets of contextual controls and can determine the offset amount to apply to the first user interface such that each of the multiple sets of contextual controls can be displayed without continuously modifying the offset amount.

Alternatively, process 500 can determine whether the offset amount of the first user interface is to be modified based on the content currently being presented in the first user interface and/or the contextual controls being presented in the additional user interface. For example, in response to receiving a user input to select a second set of contextual controls, process 500 can determine whether the offset amount of the first user interface is to be modified based on properties of the second set of contextual controls.

In some implementations, process 500 can identify contextual controls to present in connection with the first user interface at 508. In some implementations, process 500 can identify the contextual controls based on any suitable information. For example, in some implementations, process 500 can identify the contextual controls based on content presented in the first user interface. As a more particular example, as shown in and described above in connection with FIGS. 2A and 2B, in instances where the first user interface presents map content, process 500 can determine that the contextual controls are to be controls for interacting with the map content, such as selectable inputs to zoom in or out on the map, a search feature to search for locations or businesses on the map, a selectable input to get directions based on the map, and/or any other suitable controls. As another more particular example, as shown in and described above in connection with FIGS. 2C and 2D, in instances where the first user interface presents content from a fitness tracker (e.g., a pedometer, a run tracker, and/or any other suitable type of fitness tracker), the contextual controls can be controls for interacting with the fitness tracker (e.g. selectable inputs to pause a distance tracker, and/or any other suitable controls). Additionally or alternatively, in some implementations, the contextual controls can be controls for interacting with an application operating in the background on the user device, such as a media player, a messaging application (e.g., an e-mail client, a text messaging application, and/or any other suitable messaging application), and/or any other suitable type of application. For example, in some implementations, the contextual controls can be controls for starting or stopping audio content that is being presented, controls for skipping a song that is being played, controls for volume adjustment, and/or any other suitable controls. As another example, in some implementations, the contextual controls can be controls for previewing received messages, composing a new message, reading a particular message, and/or any other suitable controls. Note that, in some implementations, process 500 can determine multiple groups of contextual controls. For example, in some implementations, process 500 can identify a first group of controls suitable for interacting with content presented in the first user interface and a second group of controls suitable for interacting with an application operating in the background of the user device.

Process 500 can present the first user interface shifted by the offset at 510. For example, as shown in FIGS. 1B, 2B, and 2D, the first user interface can be shifted such that a portion of the first user interface is no longer visible on a display of the user device. As a more particular example, in instances where the first user interface is shifted upward, an upper portion of the first user interface may no longer be visible after the first user interface is shifted. In some implementations, process 500 can additionally present a second user interface that includes the contextual controls in a portion of the display that no longer includes the first user interface, as shown in and described above in connection with FIGS. 2B and 2D. Note that, in instances where process 500 identifies multiple groups of contextual controls as described above, process 500 can cause a first group of contextual controls (e.g., controls for interacting with content presented in the first user interface) to be presented, as shown in and described above in connection with FIGS. 2B and 2D. In some such implementations, process 500 can cause presentation of the first group of contextual controls to be inhibited and can cause the second group of contextual controls to be presented, for example, in response to determining that a user of the user device has swiped the first group of contextual controls in a particular direction or otherwise indicated that the second group of contextual controls is to be presented.

Process 500 can cause the first user interface to be shifted using any suitable technique or combination of techniques. For example, in some implementations, process 500 can use an event handler that detects a particular type of a user input (e.g., a button press, motion of a user device, and/or any other suitable user input as described above) that indicates that the first user interface is to be shifted. In some such implementations, the event handler can then call a function that applies an offset to currently displayed content. For example, in some implementations, the function can take as an input a size and direction of the offset, as described above in connection with block 506. As a more particular example, in some implementations, the function used can be the same as or similar to a function used for burn-in protection that causes content displayed on a screen to be periodically shifted by a predetermined amount. In some implementations, process 500 can cause the first user interface to be shifted by modifying a mapping between a logical display that represents content to be presented on the user device and a physical display that represents a display screen of the user device. For example, in some implementations, when the first user interface is presented in a first position without an offset (e.g., as shown in FIGS. 1A, 2A, and 2C and as described above in connection with block 502), there can be a one-to-one mapping between the logical display and the physical display such that each pixel represented in the logical display corresponds to a pixel of the physical display. Process 500 can then apply the offset by adding a displacement to a representation of the first user interface in the logical display. For example, in some implementations, process 500 can add blank rows or columns to represent an unused portion of the display, and/or can redraw the representation of the first user interface in the logical display in any other suitable manner based on the determined offset. Note that, in some implementations, process 500 can cause the first user interface to be shifted with any suitable animation or transition. For example, in some implementations, process 500 can cause the first user interface to appear to slide in a direction of the shift as it is shifted.

Note that, in some implementations, in response to shifting or offsetting content such that a portion of the content in the first user interface would no longer be displayed within the display of the user device, process 500 can determine whether the content should be modified such that the content fits within the remaining portion of the display. In some implementations, the user device can include a setting for indicating whether to offset the content being presented within the first user interface or to resize or otherwise redraw the content being presented within the first user interface to fit within the remaining portion of the display. Additionally or alternatively, a content provider associated with the content being presented in the first user interface can indicate whether to offset the content (or particular types of content) in response to receiving a request to present additional user interface options.

At 512, process 500 can cause the first user interface to resume being presented in an original position (e.g., without the offset). In some implementations, in instances where a second user interface with contextual controls was presented at block 510, process 500 can cause the second user interface to no longer be presented. In some implementations, process 500 can cause the first user interface to resume being presented in an original position in response to determining that a predetermined duration of time (e.g., 400 milliseconds, 500 milliseconds, one second, and/or any other suitable duration of time. In some implementations, process 500 can cause the first user interface to resume being presented using any suitable technique or combination of techniques. For example, in some implementations, process 500 can call a function that causes content to be presented, and process 500 can indicate (e.g., in a function call, and/or in any other suitable manner) that no offset is to be used. In some implementations, process 500 can call the same function used to render the first user interface with the offset to resume presentation of the first user interface without the offset.

In some implementations, at least some of the above described blocks of the process of FIG. 5 can be executed or performed in any order or sequence not limited to the order and sequence shown in and described in connection with the figure. Also, some of the above blocks of FIG. 5 can be executed or performed substantially simultaneously where appropriate or in parallel to reduce latency and processing times. Additionally or alternatively, some of the above described blocks of the process of FIG. 5 can be omitted.

In some implementations, any suitable computer readable media can be used for storing instructions for performing the functions and/or processes herein. For example, in some implementations, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting offset content are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for presenting offset content, the method comprising:
  causing a first user interface to be presented in a first position on a display of a wearable user device, wherein the first user interface occupies an entirety of the display of the wearable user device, and wherein the display of the wearable user device has a center point;
  receiving a user input that indicates that the first user interface is to be shifted to present a second user interface that includes a group of contextual controls;
  identifying, based on content included in the first user interface, the group of contextual controls, wherein the group of contextual controls includes controls for interacting with the content included in the first user interface, wherein the content included in the first user interface is content other than contextual controls, and wherein the group of contextual controls include controls for manipulating playback of media content being presented by the wearable user device;
  in response to receiving the user input, determining an offset amount to offset the first user interface from the center point of the display for presentation of the first user interface based on the group of contextual controls to be included in the second user interface, wherein the offset causes the first user interface to shift from a first position on the display of the wearable user device to a second position on the display of the wearable user device;
  causing the first user interface to be presented in the second position that has been offset from the first position by the offset amount such that a first portion of the first user interface is no longer visible when the first user interface is presented in the second position and such that a display portion of the wearable user device does not include the first user interface when the first user interface is presented in the second position; and
  causing the second user interface to be presented within the display portion of the wearable user device that does not include the first user interface when the first user interface is presented in the second position such that a second portion of the first user interface and the second user interface are both presented within the display of the wearable user device, wherein the second user interface includes the group of contextual controls for interacting with the content included in the first user interface.

2. The method of claim 1, wherein the group of contextual controls is a first group of contextual controls, the method further comprising:
  receiving a second user input dismissing the first group of contextual controls included in the second user interface to present a different group of contextual controls in the second user interface; and identifying a second group of contextual controls to be included within the second user interface in response to receiving the second user input.

3. The method of claim 2, wherein identifying the second group of contextual controls is based on a background application executing at the wearable user device, and wherein the second group of contextual controls include controls for interacting with the background application.

4. The method of claim 2, further comprising determining a modified offset amount to offset the first user interface from the center point of the display for presentation of the first user interface based on the second user input, wherein the modified offset amount to offset the first user interface from the center point of the display is different than the offset amount to offset the first user interface from the center point of the display.

5. The method of claim 4, further comprising causing the first user interface to be presented in a third position that has been offset from the first position by the modified offset amount such that a second portion of the first user interface different from the first portion of the first user interface is no longer visible and causing the second user interface to be modified to include the second group of contextual controls.

6. The method of claim 5, further comprising, in response to determining that a predetermined duration of time has elapsed, causing the first user interface to be presented in the first position and causing the second user interface to be removed, wherein the first user interface returns to occupying the entirety of the display of the wearable user device.

7. The method of claim 1, wherein the user input is a press of a button associated with the wearable user device.

8. The method of claim 1, wherein the user input is a tilt of the wearable user device detected by a motion sensor associated with the wearable user device.

9. The method of claim 8, wherein the offset amount is determined based on a magnitude of the tilt.

10. A system for presenting offset content, the system comprising:
a hardware processor that is configured to:
cause a first user interface to be presented in a first position on a display of a wearable user device, wherein the first user interface occupies an entirety of the display of the wearable user device, and wherein the display of the wearable user device has a center point;
receive a user input that indicates that the first user interface is to be shifted to present a second user interface that includes a group of contextual controls;
identify, based on content included in the first user interface, the group of contextual controls, wherein the group of contextual controls includes a first set of controls for interacting with the content included in the first user interface, wherein the content included in the first user interface is content other than contextual controls, and wherein the group of contextual controls include controls for manipulating playback of media content being presented by the wearable user device;
in response to receiving the user input, determine an offset amount to offset the first user interface from the center point of the display for presentation of the first user interface based on the group of contextual controls to be included in the second user interface, wherein the offset causes the first user interface to shift from a first position on the display of the wearable user device to a second position on the display of the wearable user device;
cause the first user interface to be presented in the second position that has been offset from the first position by the offset amount such that a first portion of the first user interface is no longer visible when the first user interface is presented in the second position and such that a display portion of the wearable user device does not include the first user interface when the first user interface is presented in the second position; and
cause the second user interface to be presented within the display portion of the wearable user device does not include the first user interface when the first user interface is presented in the second position such that a second portion of the first user interface and the second user interface are both presented within the display of the wearable user device, wherein the second user interface includes the group of contextual controls for interacting with the content included in the first user interface.

11. The system of claim 10, wherein the group of contextual controls is a first group of contextual controls, and wherein the hardware processor is further configured to:
receive a second user input dismissing the first group of contextual control included in the second user interface to present a different group of contextual controls in the second user interface; and
identify a second group of contextual controls to be included within the second user interface in response to receiving the second user input.

12. The system of claim 11, wherein the hardware processor is further configured to determine a modified offset amount to offset the first user interface from the center point of the display for presentation of the first user interface based on the second user input, wherein the modified offset amount to offset the first user interface from the center point of the display is different than the offset amount to offset the first user interface from the center point of the display.

13. The system of claim 12, wherein the hardware processor is further configured to cause the first user interface to be presented in a third position that has been offset from the first position by the modified offset amount such that a second portion of the first user interface different from the first portion of the first user interface is no longer visible and causing the second user interface to be modified to include the second group of contextual controls.

14. The system of claim 13, wherein the hardware processor is further configured to, in response to determining that a predetermined duration of time has elapsed, cause the first user interface to be presented in the first position and causing the second user interface to be removed, wherein the first user interface returns to occupying the entirety of the display of the wearable user device.

15. The system of claim 10, wherein the user input is a press of a button associated with the wearable user device.

16. The system of claim 10, wherein the user input is a tilt of the wearable user device detected by a motion sensor associated with the wearable user device.

17. The system of claim 16, wherein the offset amount is determined based on a magnitude of the tilt.

18. A non-transitory computer readable medium containing computer executable instructions that, when executed by a processor, cause the processor to:
cause a first user interface to be presented in a first position on a display of a wearable user device, wherein the first user interface occupies an entirety of the display of the wearable user device, and wherein the display of the wearable user device has a center point;

receive an indication of a user input that indicates that the first user interface is to be shifted to present a second user interface that includes a group of contextual controls;

identify, based on content included in the first user interface, the group of contextual controls, wherein the group of contextual controls includes controls for interacting with the content included in the first user interface, wherein the content included in the first user interface is content other than contextual controls, and wherein the group of contextual controls include controls for manipulating playback of media content being presented by the wearable user device;

in response to receiving the indication of the user input, determine an offset amount to offset the first user interface from the center point of the display for presentation of the first user interface based on the group of contextual controls to be included in the second user interface, wherein the offset causes the first user interface to shift from a first position on the display of the wearable user device to a second position on the display of the wearable user device;

cause the first user interface to be presented in the second position that has been offset from the first position by the offset amount such that a first portion of the first user interface is no longer visible when the first user interface is presented in the second position and such that a display portion of the wearable user device does not include the first user interface when the first user interface is presented in the second position; and cause the second user interface to be presented within the display portion of the wearable user device does not include the first user interface when the first user interface is presented in the second position such that a second portion of the first user interface and the second user interface are both presented within the display of the wearable user device, wherein the second user interface includes the group of contextual controls for interacting with the content included in the first user interface.

* * * * *